(12) United States Patent
Lin et al.

(10) Patent No.: US 12,526,949 B2
(45) Date of Patent: Jan. 13, 2026

(54) CABLED OCP CONNECTOR

(71) Applicant: HEWLETT PACKARD ENTERPRISE DEVELOPMENT LP, Spring, TX (US)

(72) Inventors: Yu Han Lin, Taoyuan (TW); Chih-Wei Chiang, Taoyuan (TW); Chao Lin Hsiao, Taipei (TW); Wei-Chen Tu, New Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 102 days.

(21) Appl. No.: 18/648,587

(22) Filed: Apr. 29, 2024

(65) Prior Publication Data

US 2025/0338421 A1    Oct. 30, 2025

(51) Int. Cl.
  *H05K 7/14*        (2006.01)
  *G06F 1/18*        (2006.01)
  *H01R 13/74*       (2006.01)

(52) U.S. Cl.
  CPC .......... *H05K 7/1452* (2013.01); *G06F 1/183* (2013.01); *H01R 13/748* (2013.01)

(58) Field of Classification Search
  None
  See application file for complete search history.

(56) References Cited

U.S. PATENT DOCUMENTS

| | | | | |
|---|---|---|---|---|
| 10,356,930 B2* | 7/2019 | Schulze | ............... | H05K 7/1425 |
| 11,818,855 B2* | 11/2023 | Li | ............ | G06F 1/185 |
| 2003/0190839 A1 | 10/2003 | Fujita et al. | | |
| 2022/0121251 A1* | 4/2022 | Chang | ..................... | G06F 1/187 |
| 2023/0050441 A1* | 2/2023 | Li | ........................... | G06F 1/186 |
| 2023/0376084 A1* | 11/2023 | Kartadinata | ........ | H05K 5/0286 |

FOREIGN PATENT DOCUMENTS

| CN | 112783285 A * | 5/2021 | ............ | G06F 1/185 |
|---|---|---|---|---|
| EP | 1993173 A1 | 11/2008 | | |

* cited by examiner

*Primary Examiner* — Xanthia C Relford
*Assistant Examiner* — Xanthia C Cunningham
(74) *Attorney, Agent, or Firm* — Jones Robb, PLLC (57) ABSTRACT

A device, a system and a method. The device comprising an OCP connector including an OCP receptacle, a cable connector, first attachment features, and second attachment features. The OCP receptacle may be configured to accept an OCP edge connector of an OCP module. The cable connector may be configured to accept one end of a cable wherein the other end of the cable may be coupled with a primary system board. The first attachment features may be configured to attach the OCP connector to a horizontal support. The second attachment features may be configured to attach the OCP connector to a vertical support. Either support may be used to couple the OCP connector with a computer system without modification to the OCP connector.

20 Claims, 7 Drawing Sheets

CABLED OCP CONNECTOR

INTRODUCTION

Server computing systems may be configured to use pluggable modules such as hot swappable storage drives, Network Interface Cards (NICs), etc. These pluggable modules may be designed to plug into bays that may be accessible from outside the server without having to open the main chassis. Some bays may be disposed at a front panel of the chassis so as to be accessible from the front of the device, while other bays may be disposed at a rear panel of the chassis so as to be accessible from the rear of the device. Pluggable modules may come in a variety of form factors specified by various standards, including form factors specified by the Open Compute Project (OCP)—for example, Network Interface Cards (NICs) are often deployed as OCP modules. Some pluggable modules such as storage drives have commonly been deployed in both front and rear accessible bays, but generally, OCP modules have been used in rear-accessible bays.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

The drawings are included to provide a further understanding of the present disclosure and are incorporated in and constitute a part of this specification. The drawings illustrate one or more examples of the present teachings and together with the description explain certain principles and operations. In some occasions, details that are not necessary for an understanding of an instance of this disclosure or that render other details difficult to perceive may have been omitted.

DETAILED DESCRIPTION

As noted above, OCP modules are generally used in rear-accessible drive bays at a rear panel of the chassis of the server. Specifically, OCP modules are usually connected directly to a system board via OCP connectors which are straddle-mounted to the rear edge of the system board to receive the OCP modules inserted through the rear panel with the OCP modules being parallel to and co-planar with the system board. Under some circumstances, it may be desired to have an OCP module located at the front panel of the information processing system, such as a server for example. This may be desired, for example, because the rear location of the OCP modules may result in insufficient cooling for the modules, as the modules in the rear bays may receive air which has been preheated by other components of the server. Moving the OCP modules to the front of the server may help improve cooling.

However, positioning the OCP modules at the front panel of a server can be challenging. Specifically, it may not be feasible to provide the standard straddle-mount OCP connectors at a front edge of the system board to receive OCP modules inserted through the front panel because the distance between the front panel and the front edge of the system board may be too great. In addition, there may also be components, such as fans, which sit between the front panel and the system board, and these other components might block OCP modules inserted through the font panel and prevent them from reaching the connectors.

It may also be desired, in some circumstances, to position the OCP module in some other location in the information processing device besides the rear or front accessible bays. However, the standard OCP connectors mounted to the primary system board are generally located in positions and/or orientations which are not convenient for directly mounting an OCP module. For example, some connectors on the system board may require the OCP module to be oriented perpendicular to the system board, and in many systems, there is insufficient height in the system to allow for this. Other system board connectors may be positioned close to other components, leaving insufficient room for the OCP module to be directly connected to the system board connector. Still other system board connectors may be positioned such that an OCP module connected thereto would receive insufficient airflow, would impede airflow to other components, and/or would be inconvenient to access. Thus, it may not be feasible, or if feasible may be inconvenient, to connect the OCP module directly to system board connectors in locations outside of the rear OCP bays.

To address these and other issues, disclosed herein is a cabled OCP connection system which can allow an OCP module to be installed in any of a variety of positions in an information processing device while being indirectly connected to the primary system board via a cable. This cabled OCP connection system may include a cable having an OCP connector at one end to connect to the OCP module and another connector at the other end to connect to a system board connector of the primary system board. This allows the OCP module to be installed in a variety of locations, such as a front bay, a rear bay, or some other location in the chassis, because the position of the OCP connector is not limited by the positions or orientations of the system board connectors.

The OCP connector may be configured to attach to a support structure adjacent a bay which receives an OCP module. The attachment of the OCP connector to the support structure may align the OCP connector relative to the bay and support the OCP connector so as to enable blind mating with an OCP module inserted into the bay. Blind mating refers to the connectors of the module and the bay being automatically mated together as a result of the user applying forces to the module to insert it into the bay without the user needing to see or manually align the connectors or to handle the connectors in any way. This is in contrast to connecting a loose connector at the end of a cable to a module, which may require a user to manually align and handle the connectors, which may require opening of the chassis and imposes an inconvenience to the user.

Moreover, the OCP connector of the cable may be a versatile OCP connector capable of attachment to a variety of different support structures which may be found at different locations in the chassis. For example, a supporting structure in a rear OCP bay may be different than a supporting structure found at a front bay, but the OCP connector may be capable of connecting to either of these supporting structures. This versatility can make it easier to deploy the OCP connector to various locations in the chassis, including at least a front-accessible or rear-accessible configuration using the same OCP connector in either location. In other words, because a single type of cabled OCP connector may be used in any of a variety of installation positions, it is not necessary to design and produce multiple different types of cables having different OCP connectors, with each being designed specifically for use in one type of installation position. Using a single cable design for many different installation positions instead of many different cable designs reduces development costs, manufacturing costs, and logistical costs. In addition, the versatility of the connector may allow for easier reconfiguration of the system after its manufacture, such as by moving an OCP module from one installation position (e.g., a rear bay) to another installation position (e.g., a front bay) by simply detaching, moving, and reattaching the existing OCP connector, while avoiding the hassle and cost of first having to obtain a new connector designed for the new installation position.

An example cabled OCP connector may have on one side an OCP edge receptacle, such as a 4C or 4C+ edge receptacle. These receptacles may use an edge receptacle defined by a standard such as the SFF-TA-1002 standard. The other side may be configured to accept conductors (wires) of the cable, which are permanently connected (e.g., soldered) to the conductive contacts (pins) of the receptacle. The other ends of the conductors are permanently connected to one or more connectors at the other end of the cable. These other connectors would then connect to corresponding connectors on the primary system board housed in the chassis, such as data or power connections, for example. Mini Cool Edge IO (MCIO) connector receptacles may be used as the primary system board connectors, for example, and corresponding MCIO plugs may be used as the connectors at the second end of the cable.

The cabled OCP connector may have two sets of attachment features which allow for at least two different methods of attaching to the server. First attachment features may attach the cabled OCP connector to a horizontal support by way of fasteners that run perpendicular to the mating axis of the OCP edge receptacle. Second attachment features may attach the cabled OCP connector to a vertical support by way of fasteners that run parallel to the mating axis of the OCP edge receptacle. Either set of attachment features may be used without requiring a change to the cabled OCP connector and without changing the orientation of the cabled OCP connector within the chassis. It is possible that both attachment features may be useable at the same time. The ability of the OCP connector to attached to different types of supports, such as a horizontal support and a vertical support, facilities the installation of the OCP connector in different positions in the chassis which may have different types of supports associated therewith—for example, the front bays of a chassis may have vertical supports to which the OCP connector can attach (using the second attachment features) whereas a rear bay of the chassis may have a horizontal support to which the same OCP connector can attach (using the first attachment features).

The first attachment features may include a horizontal wall configured to be parallel to and engage with the horizontal support. The horizontal wall may include one or more apertures to allow fasteners, such as screws for example, to pass through the horizontal wall and engage with the horizontal support. On the side of the horizontal wall that engages with the horizontal support may be one or more protrusions configured to engage with complementary recesses on the horizontal support to aid in aligning the cabled OCP connector by controlling the position of the cabled OCP connector relative to the horizontal support when attaching it to the horizontal support. The protrusions may be small cylindrical posts which may have domed tops or an elongated ridge, for example. Any size, shape, or number of protrusions may be used. The horizontal support may be a motherboard tray or basepan of the chassis of the computing system, for example. In some examples, the apertures and recesses in the motherboard tray or basepan which facilitate the attachment of the OCP connector may be positioned adjacent to a rear-accessible OCP bay such that, upon attachment of the OCP connector, the OCP connector is positioned in the rear OCP bay so as to receive a connector of an OCP module inserted into the OCP bay.

The second attachment features may include a vertical fin protruding from the cabled OCP connector and extending along the top of the cabled OCP connector. The vertical fin comprises one or more apertures to receive fasteners, and the fin is configured such that the apertures through the fin are parallel to the mating axis of the OCP edge receptacle. Fasteners, such as screws for example, may pass through the apertures in the fin and engage with the vertical support. The fin is configured to be in parallel contact with the vertical support when the OCP connector is attached thereto such that engagement between the vertical fin and the vertical support constrains the OCP connector and provides additional support to resist rotation (tilting) of the connector while an OCP module is being mated therewith. On the side of the fin facing the vertical support may be one or more protrusions configured to engage with complementary recesses on the vertical support to aid in aligning the cabled OCP connector by controlling the position of the cabled OCP connector relative to the vertical support when attaching it to the vertical support. The protrusions may be small cylindrical posts which may have domed tops or an elongated ridge, for example. Any size, shape, or number of protrusions may be used. In some examples, the vertical support may be a metal frame which is attached to rear side of a drive cage at a front panel of the chassis, with the drive cage comprising one or more bays capable of receiving an OCP module (e.g., with an adapter). The frame comprises one or more mounting locations for OCP connectors arranged such that OCP connectors attached thereto are positioned in corresponding bays of the drive cage so as to receive connectors of OCP modules inserted into the bays. The frame and OCP connector(s) mounted thereto together form a backplane for the drive cage. The vertical support may alternatively be a metal frame configured to be coupled with a riser cage configured to house one or more expansion cards at the rear of the chassis. The riser cage may be configured to accept one or more cabled OCP connectors which are connected to the one or more expansion cards.

Other cage configurations may be used. For example, a single cage may be configured as a dual-purpose cage capable of accepting both one or more storage drives and one or more OCP modules within the same cage structure. Alternatively, a cage structure may be configured to accept one or more OCP modules in any configuration of side-by-side or stacked layouts.

By having a single format cabled OCP connector that can be deployed in so many configurations, it simplifies the manufacturing process of the cabled OCP connectors. There is no need to have different versions of the connector depending on how and where it is to be deployed. A single stock-keeping-unit (SKU) may be used, reducing manufacturing and logistical costs.

Figure 1:
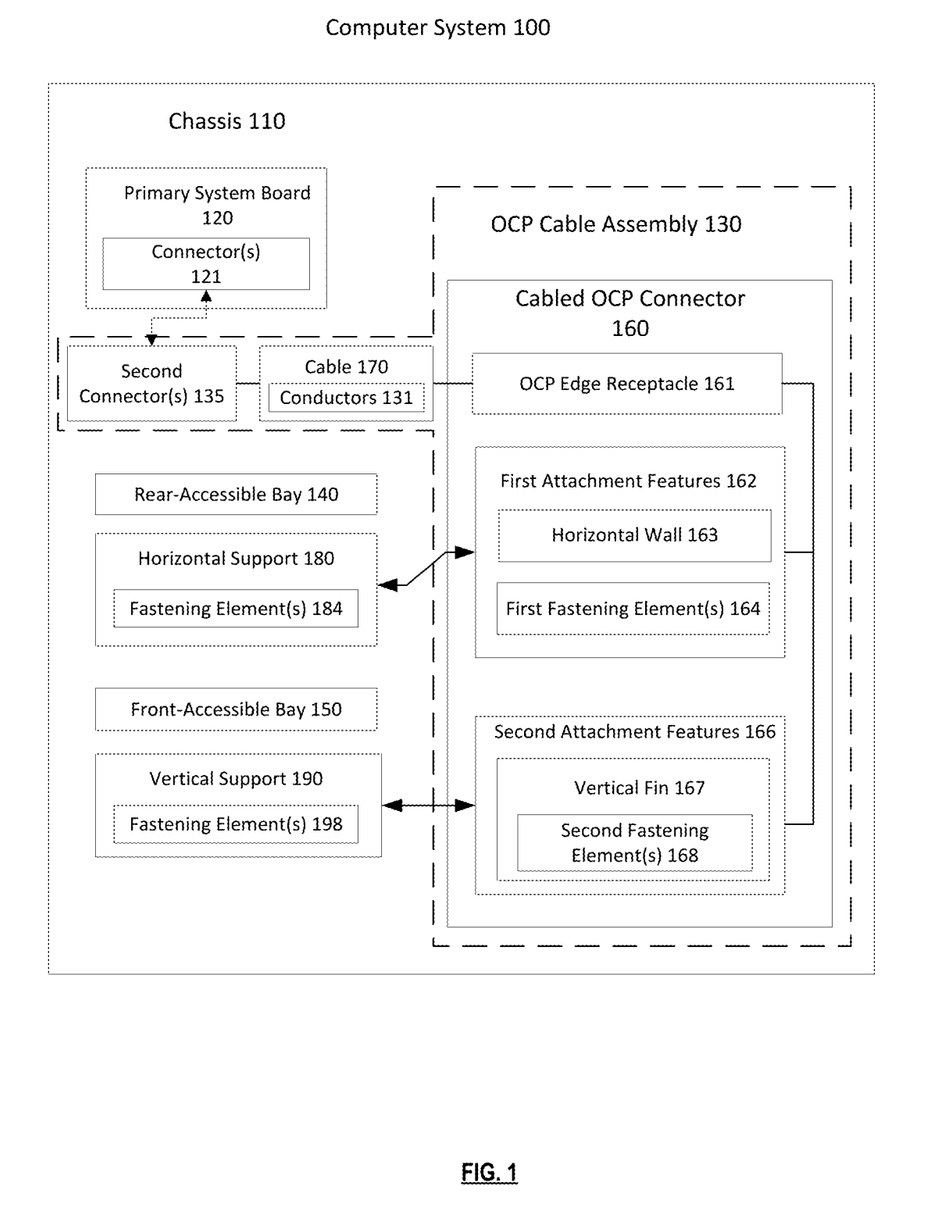
FIG. 1 is a block diagram illustrating an example of a computer system that includes a cabled OCP connector.

FIG. 1 illustrates an example computer system 100 that includes an OCP cable assembly 130 comprising a cabled OCP Connector 160. The computer system 100 may be a server, networking device, or other computing device. The OCP cable assembly 130 is configured to be used in a computer system and thus is illustrated and described herein in the context of the computer system 100 to aid understanding. Moreover, in some cases, the OCP cable assembly 130 may be provided (made, sold, etc.) as part of such a computer system, and some examples disclosed herein thus comprise a computer system with the cable assembly 130 installed. However, the OCP cable assembly 130 may alternatively be provided (made, sold, etc.) separate from the system 100, and some examples disclosed herein thus comprise the OCP cable assembly 130 by itself.

The computer system 100 includes a chassis 110 and within that chassis 110 is a primary system board 120. The primary system board 120 may be a Host Processor Module (HPM) or motherboard, for example. The primary system board 120 includes various components such as one or more processors, memory, etc., (not illustrated), which would be familiar to those of ordinary skill in the art. In addition, included on the primary system board 120 is one or more connectors 121 configured to receive corresponding one or more second connectors 135 of the OCP cable assembly 130. Connector 121 may be an MCIO connector, for example. While a single connector 121 is shown, multiple connectors 121 may be present.

Within the chassis 110 may be one or more rear-accessible bays 140 and one or more front-accessible bays 150. Each bay 140 and 150 may be configured to receive an OCP module. The front bay(s) 150 are positioned at a front panel of the chassis 110 and configured to receive OCP modules inserted into the chassis 110 from a position exterior to the chassis 110 on a front side thereof. The rear bay(s) 140 are positioned at a rear panel of the chassis 110 and configured to receive OCP modules inserted into the chassis 110 from a position exterior to the chassis 110 on a rear side thereof. In some examples, the chassis 110 may also have bays (not illustrated) to receive other modules, which in some implementations may include front bays configured to receive storage drives (e.g., Enterprise & Datacenter Standard Form Factor (EDSFF) storage drives). In some of these examples, at least one front bay 150 for receiving an OCP module is formed from a subset of the front bays for receiving storage drives (e.g., two front storage drive bays may be combined to form one front OCP module bay 150) with an adapter being attached to the OCP module to enable its installation in bays configured to receive storage drives, as described in U.S. patent application Ser. No. 18/628,888, titled Adapter for OCP Module and filed on Apr. 8, 2024, the entire contents of which are incorporated herein by reference. In other words, in some examples, a front bay 150 may be configured to interchangeably receive either an OCP module or one or more other modules such as storage drives. In other examples, the front OCP bay 150 may be configured to natively receive an OCP module without requiring the use of an adapter.

The front bays 150 may be part of a pluggable module cage, which is a compartment within the chassis 110 which houses and defines the bays 150. In some examples, this pluggable module cage may be a drive cage which defines storage drive bays, some or all of which may also form the front OCP bays 150 through the use of the adapters as described above. Each bay 140, 150 may comprise engagement features to engage the OCP modules, guide them into installed positions, and support the OCP modules once installed. For example, the rear bays 140 may comprise two parallel rails attached to a basepan of the chassis 110 and configured to engage the lateral edges of a PCB of an OCP module as it is inserted in the rear bay 140. As another example, the front bays 150 may be part of a drive cage for storage drives and may include protrusions (flanges) which are configured to engage with either storage drives inserted therein or engagement features of an OCP adapter attached to an OCP module, the OCP adapter allowing the OCP module to be inserted into the bay 150.

The OCP cable assembly 130 comprises a cabled OCP connector 160 at one end, one or more second connector(s) 135 at an opposite end, and a cable 170 comprising a plurality of conductors 131 extending therebetween. It is noted that in everyday usage, "cable" may sometimes be used generically to refer to the entire assembly comprising the electrical conductors and the connectors attached to the ends thereof, and other times may be used more specifically to refer to the bundle of electrical conductors. To avoid confusion, herein "cable" is used to refer to the bundle of electrical conductors while "cable assembly" is used to refer to the combination of the electrical conductors and the connectors attached thereto. The cabled OCP connector 160 comprises an OCP receptacle 161 configured to mate with (receive) a complementary OCP edge-connector of an OCP module and to electrically connect thereto when mated. For example, the receptacle 161 of the cabled OCP connector 160 may be configured as an OCP 4C or 4C+ receptacle. Each second connector 135 is configured to mate with (be received in) a complementary connector 121 of the primary system board 120. For example, the connector 121 may be configured as an MCIO receptacle and the second connector 135 may be configured as an MCIO plug. The conductors 131 are electrically connected to corresponding electrical contacts (e.g., pins) of the cabled OCP connector 160 at one end and electrically connected to corresponding electrical contacts (e.g., pins) of the second connector(s) 135 at the other end. Thus, when an OCP module is mated with the OCP connector 160, the OCP module is electrically connected to the system board 120 via electrical pathways comprising the OCP connector 160, conductors 131, and second connector(s) 135. The conductors 131 may be bundled together into one or more cables 170. In some examples, the conductors 131 are permanently electrically connected to the electrical contacts of the OCP connector 160 and to the electrical contacts of the second connector 135, for example by soldering, crimping, etc. (permanent in this context means that the assembly is not designed for connection/disconnection during normal usage, as evidenced by, for example, disconnection of the assembly requiring physical alterations to one or more of the assembled parts or fasteners such as melting, deforming, cutting, tearing, etc.).

The OCP connector 160 is installable at any of a variety of installation locations within the computer system 100 by positioning the OCP connector 160 in the installation position and attaching the OCP connector 160 to a corresponding support at the installation position. These installation positions include at least installation positions at the front bay(s) 150 and at the rear bay(s) 140. In some examples, the installation positions may further include an installation position in a riser cage. In some examples, the installation positions may include additional installation positions. The OCP cable assembly 130 may allow for the OCP connector 160 to be positioned at any of the installation positions while the second connector 135 remains connected to the system board 120, with the cable 170 allowing for routing around intervening components, such as fans. The OCP connector 160 is also configured to be mounted to the chassis 110 via attachment to any one of a variety of supports which are part of, or are coupled to, the chassis 110, and this ability to be attached to different types of supports may facilitate the installation of the OCP connector 160 at the variety of installation positions. The OCP connector 160 may include multiple different attachment features, described in greater detail below, which may enable the attachment to different types of supports at different installation locations.

As noted above, the installation positions for the OCP connectors 160 include installation positions at the rear and front bays 140 and 150, and in some examples also installation positions at a riser cage or other location. When an OCP connector 160 is installed at one of the rear or front bays 140 or 150, the OCP connector 160 may be disposed adjacent or in the respective bay 140 or 150 such that an OCP module inserted into the bay 140 or 150 is guided during its insertion into blind-mating with the OCP receptacle 161. When an OCP connector 160 is installed in a riser cage, the OCP connector 160 may be arranged so as to mate with the edge connector of an OCP module installed as an expansion card in the riser cage. When an OCP connector 160 is installed at another installation position in the chassis 110, the OCP connector 160 may be arranged so as to mate with the edge connector of an OCP module mounted to the chassis 110 adjacent the installation position. In some examples of the system 100, each of the bays 140, 150 may have a cabled OCP connector 160 of a corresponding OCP cable assembly 130 installed therein to accept OCP modules. For example, a first OCP cable assembly 130 may have its OCP connector 160 installed in a first rear bay 140, a second OCP cable assembly 130 may have its OCP connector 160 installed in a first front bay 150, and so on for each bay 140 and 150 (note that the bays 140 and 150 do not necessarily include all bays in the system 100). In other examples, each bay 140 and 150 may be capable of having an OCP connector 160 installed therein but only some of the bays 140, 150 might currently have a cabled OCP connector 160 installed therein. For example, an OCP connector 160 of a first OCP cable assembly may initially be installed at a rear bay 140 but not at a front bay 150 and this same OCP connector 160 may later be repositioned from the rear bay 140 to the front bay 150, or vice versa. As another example, an OCP connector 160 of a first OCP cable assembly 130 may initially be installed at a rear bay 140 but a front bay 150 may have no OCP connector installed therein, and then later a second OCP cable assembly 130 may be added and the OCP connector 160 thereof may be installed in the front bay 150, or vice versa.

The system 100 may also include one or more horizontal supports 180 and one or more vertical supports 190. These supports 180 and 190 are either part of the chassis 110 or are mechanically coupled, directly or indirectly, to the chassis 110. The supports 180 and 190 are two types of supports which are examples of the aforementioned set of supports which the OCP connector 160 is configured to attach to, and which mount the OCP connector 160 to the chassis 110. The horizontal support(s) 180 may comprise a generally flat horizontal surface which engages attachment features of the OCP connector 160 in an installed state of the horizontal support 180 in the system 100 and an attached state of the OCP connector 160 to the horizontal support 180, while the vertical support(s) 190 may comprise a generally flat vertical surface which engages attachment features of the OCP connector in an installed state of the vertical support 190 in the system 100 and an attached state of the OCP connector 160 to the vertical support 190. As used herein, horizontal means a direction or orientation parallel to a component-bearing surface of the primary system board 120 while vertical means a direction or orientation perpendicular to horizontal; these directions as defined herein are relative to the system board 120 and do not imply any limitation regarding any orientation relative to an external reference frame, such as the ground.

In some examples, the horizontal support 180 comprises a portion of the motherboard tray or basepan of the chassis 110 which is adjacent to one of the rear bays 140, such that installation of the OCP connector 160 at the rear bay 140 comprises attaching the OCP connector 160 to the horizontal support 180. For example, OCP guide rails may be attached to the motherboard tray or basepan adjacent an opening in the rear panel and extending in a front-to-rear direction to define a rear bay 140 therebetween, and the OCP connector 160 may be attached to the horizontal support 180 near the front ends of the OCP guide rails so as to mate with an OCP module inserted into the bay 140.

In some examples, the vertical support 190 comprises a vertical panel which is attached to the chassis 110 at a front bay 150 such that installation of the OCP connector 160 at the front bay 150 comprises attaching the OCP connector 160 to the vertical support 190. In some of these examples, the vertical panel forming the vertical support 190 may be configured to receive multiple OCP connectors 160 attached thereto, with each OCP connector positioned in alignment with a corresponding one of the front bays 150. In some examples, the front bay 150 may be part of a drive cage and the vertical panel and may form a backplane thereof. In some examples, the vertical support 190 may comprise a bracket of a riser cage. For example, the riser cage may include a vertical rear panel, a vertical side panel coupled perpendicularly together, and a horizontal top panel coupled to the rear and side panels, and the vertical support 190 may be disposed at a front side of the riser cage opposite from the rear panel and coupled to either or both of the top or side panels, with the OCP connector 160 facing rearward into an interior space within the riser cage. In some examples, the system 100 comprises multiple vertical supports 190 including one vertical support 190 which is disposed adjacent the front bay 150 (e.g., forming a backplane of a drive cage) and another vertical support which is part of a riser cage.

The cabled OCP connector 160 includes first attachment features 162 and second attachment features 166, each connected to the OCP edge receptacle 161. The first attachment features 162 are configured to engage with the horizontal support 180 to attach the cabled OCP connector 160 thereto. The second attachment features 166 are configured to engage with the vertical support 190 to attach the cabled OCP connector 160 thereto. These features will be described in greater detail below.

The first attachment features 162 may include horizontal wall 163. Horizontal wall 163 is configured to, when cabled OCP connector 160 is attached to horizontal support 180, be parallel to and engage with the horizontal support 180. Horizontal wall 163 may include one or more fastening elements 164 which are configured to directly or indirectly engage with corresponding fastening elements 184 of the horizontal support 180 to fasten the OCP connector 160 to the horizontal support 180. In some examples, the fastening elements 164 engage directly with the fastening elements 184—for example, the fastening elements 164 may be configured as latches and the fastening elements 184 as latch receivers (or vice versa) which interlock. In other examples, the fastening elements 164 engage indirectly with the fastening elements 184 via a separate fastener (not illustrated) which mutually engages both. The fastener may be a screw, rivet, or any other mechanical fastener. For example, the fastening elements 164 may comprise apertures that pass through the horizontal wall 163 and the fastening elements 184 may comprise fastener receivers (not illustrated) (e.g., nut, threaded sleeve, threaded hole, aperture etc.) which are attached to the horizontal support 180 such that fasteners can be extended through the apertures of fastening elements 164 and into the fastener receivers of fastening elements 184, or vice versa.

In some examples, horizontal wall 163 may also include first protrusions. The one or more first apertures may be configured to receive fasteners for attaching the cabled OCP connector 160 to the horizontal support 180. Screws or thumbscrews may be used, for example. The one or more first protrusions may be configured to align and engage with complementary first recesses on the horizontal support 180 to ensure that the cabled OCP connector 160 is properly positioned and held in place as it is attached to the horizontal support 180. More specifically, in some cases, the fasteners alone may not be capable of aligning the OCP connector 160 relative to a desired installation position with a desired level of precision (e.g., due to tolerance in the fasteners to allow for easier fastening thereof), and in such cases the protrusions and first recesses may be more precisely positioned and dimensioned so as to, when engaged, ensure a desired level of precision in the positioning of the OCP connector 160. The horizontal support 180 may be a motherboard tray or basepan of the chassis 110, for example, and the fastening elements 184 may be situated adjacent to rear-accessible bay 140 such that the OCP edge receptacle 161 is positioned to mate with the edge connector of an OCP module installed in the rear-accessible bay 140.

The second attachment features 166 may include vertical fin 167. Vertical fin 167 is configured to, when cabled OCP connector 160 is attached to vertical support 190, be parallel to and engage with the vertical support 190. Vertical fin 167 may include one or more fastening elements 168 which are configured to directly or indirectly engage with corresponding fastening elements 198 of the vertical support 190 to fasten the OCP connector 160 to the vertical support 190. In some examples, the fastening elements 168 engage directly with the fastening elements 198—for example, the fastening elements 168 may be configured as latches and the fastening elements 198 as latch receivers (or vice versa). In other examples, the fastening elements 168 engage indirectly with the fastening elements 198 via a fastener (not illustrated) which engages both. The fastener may be a screw, rivet, or any other mechanical fastener. For example, the fastening elements 168 may comprise second apertures that pass through vertical fin 167. Vertical fin 167 may also include second protrusions. The one or more second fastening elements 168 may be configured to receive fasteners for attaching the cabled OCP connector 160 to the vertical support 190. Screws or thumbscrews may be used, for example. The one or more second protrusions may be configured to align with complementary second recesses on the vertical support 190 to ensure that the cabled OCP connector 160 is properly positioned and held in place as it is attached to the vertical support 190.

In some examples, the vertical support 190 may include a support opening for the cabled OCP connector 160 to partially extend through such that the vertical fin 167 abuts the vertical support 190 adjacent the support opening. The vertical support 190 may be situated adjacent to front-accessible bay 150 such that the OCP edge receptacle 161 is positioned to mate with the edge connector of an OCP module installed in the front-accessible bay 150.

Figure 2A:
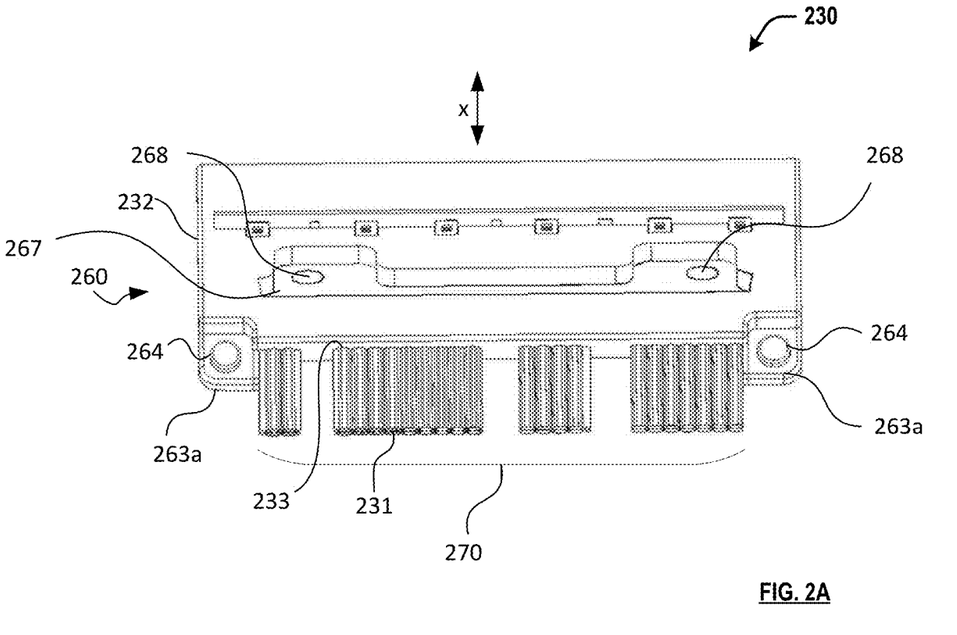
FIG. 2A is a perspective view of a cabled OCP connector.
Figure 2B:
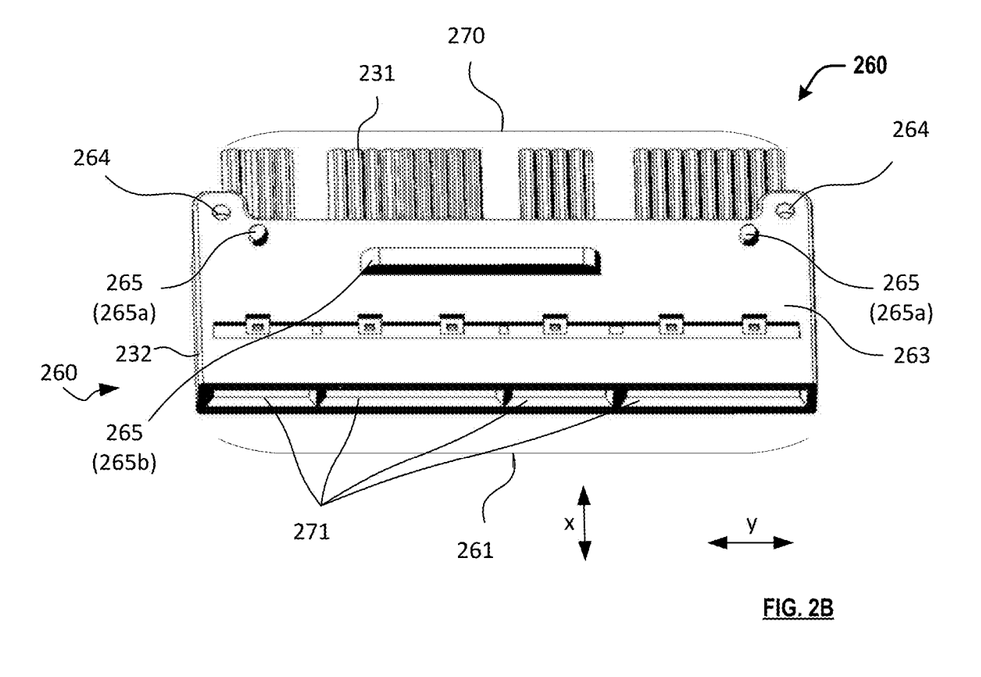
FIG. 2B is another perspective view of the cabled OCP connector from FIG. 2A.
Figure 2C:
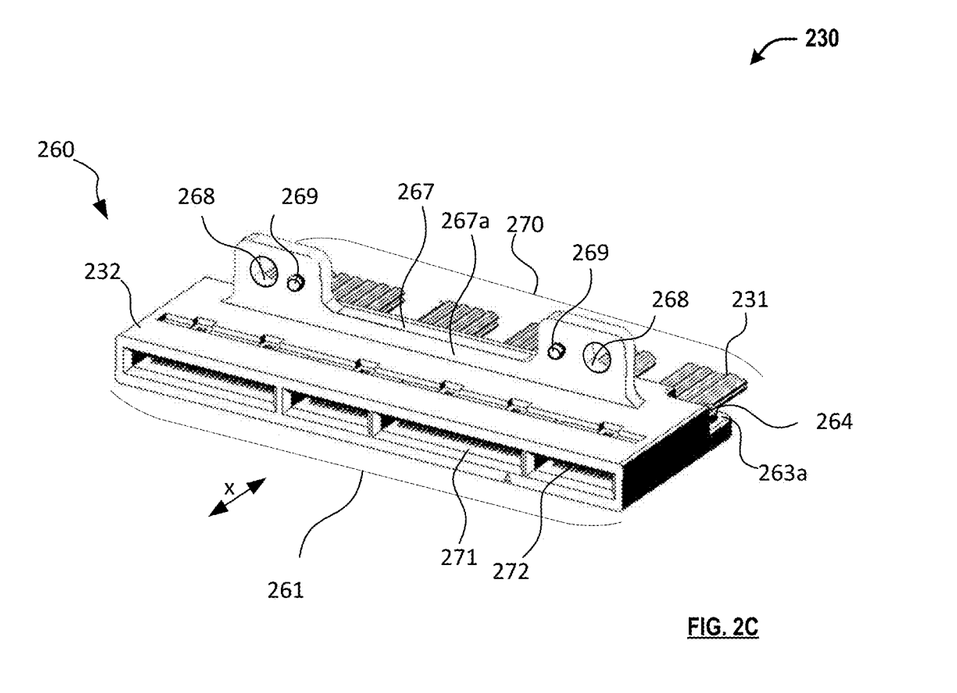
FIG. 2C is another perspective view of the cabled OCP connector from FIG. 2A.

Now referring to FIGS. 2A-2C, an example OCP cable assembly 230 comprising an example cabled OCP connector 260 will be described. The OCP cable assembly 230 is one example implementation of the OCP cable assembly 130 described above. FIG. 2A illustrates OCP cable assembly 230 and cabled OCP connector 260 from a top-rear view perspective. FIG. 2B illustrates OCP cable assembly 230 and cabled OCP connector 260 from a bottom-front view perspective. FIG. 2C illustrates OCP cable assembly 230 and cabled OCP connector 260 from a perspective above, to the front, and to the side. In reference to FIGS. 2A-C, directional terms such as "top" and "bottom" are used merely for ease of explanation and are to be understood relative to the orientations depicted in the figures. They are not intended to outline implementation limitations or to be limiting in any way.

OCP cable assembly 230 comprises multiple electrical conductors 231 (e.g., wires) (only one is labeled) grouped into one or more cables 270, a cabled OCP connector 260 connected to one end of the conductors 231, and a second connector (not illustrated) connected to the other end of the conductors 231. The second connector may follow an industry standard format, and thus is not illustrated herein. Moreover, only a portion of the electrical conductors 231 immediately adjacent to the OCP connector 260 are shown to simplify the drawings, but it should be understood that the electrical conductors 231 may extend any desired length and may be grouped together in various groupings and sheathed in any desired manner as would be understood by those or ordinary skill in the art.

Cabled OCP connector 260 includes a connector housing 232 which has an OCP edge receptacle 261 on one side (see FIG. 2B), which may be referred to herein as a front side. The connector housing 232 also has openings 233 (only one is labeled) on another side thereof through which the conductors 231 pass into an interior (not illustrated) of the housing 232 (See FIG. 2A). In the example of FIGS. 2A-2C, the openings 233 are disposed in a rear side of the housing 232, opposite from the receptacle 261, such that conductors 231 extend out of the housing 232 along directions parallel to a mating axis X of the receptacle 261, but in other examples the openings 233 could be positioned in another side of the housing 232 such that the conductors 231 extend out of the housing 232 along directions perpendicular to the mating axis X.

OCP edge receptacle 261 is configured to accept the edge connector of an OCP module. In particular, OCP edge receptacle 261 comprises a number of recesses 271 (sockets) which extend along a lateral dimension of the housing 232 (parallel to axis y in FIG. 2B) and which are recessed from a front face of the housing 232 along a depth dimension of the housing (parallel to the mating axis x in FIG. 2B). The recesses 271 are configured such that an edge connector of the OCP module which is aligned with the recesses 271 can be inserted into the recesses 271 by relative translation between edge connector and OCP receptacle 261 along the mating axis x. The recess 271 comprise electrical contacts 272 (e.g., pins) which are configured to engage corresponding electrical contacts (e.g., PCB gold fingers) of the OCP edge connector of the OCP module. The OCP edge receptacle 261 may have a form factor and electrical pin out corresponding to that specified by an OCP specification, such as that of an OCP 4C or 4C+ receptacle-style connector. Each electrical contact 271 is electrically connected to a corresponding electrical conductor 231. The connection between contacts 271 and conductors 231 may be direct or may be indirect via a, an intervening component, such as a PCB inside the housing.

The OCP connector 260 also includes a horizontal wall 263, which is an example implementation of horizontal wall 163. In this example, horizontal wall 263 is formed by a bottom surface of the housing 232. At two rear-side corners of the housing 232, portions 263a of the horizontal wall 263 protrude from the housing 232, and these portions 263a of the horizontal wall 263 include first apertures 264 extending vertically therethrough. These first apertures 264 are example implementations of the first fastening elements 164 described above, and are configured to receive a fastener inserted therethrough. A head of the fastener may abut a top surface of the protruding portions 263a. A bottom surface of the horizontal wall 263 may rest in flush contact with a top surface of motherboard tray or basepan 280 when the OCP connector 260 is installed therein such that the mating axis x is parallel to the tray or basepan 280 (and hence parallel to a system board mounted thereon), as described below in relation to FIG. 4. The OCP connector 260 further comprises first protrusions 265 protruding vertically downward from the horizontal wall 263. These first protrusions 265 include a first type of protrusions 265a configured to engage with (be received in) corresponding recesses in the tray or basepan 280 and second protrusion 265b configured to either engage an edge of a motherboard tray or be received in a recess in a tray or basepan. The first protrusions are configured to, by engaging with the tray/basepan, align the OCP connector 260 relative to a predetermined installation position so that the OCP connector 260 can blind mate with an OCP module inserted into a bay 240, 250. In the illustrated example, the first protrusions 265 comprises two types of protrusions, with two protrusions 265a being shaped as cylinders with tapered (e.g., dome-like) tips and one protrusion 265b being shaped like a ridge or fin, but, it should be understood that in other examples any number or shape of first protrusions 265 may be used.

The OCP connector 260 also includes a vertical fin 267, shown in FIGS. 2A and 2C. This is an example implementation of vertical fin 167. In this example, vertical fin 267 is formed by a protrusion which protrudes vertically upward from a top surface of the housing 232. Furthermore, in this example second apertures 268 extend horizontally through vertical fin 267. The second apertures 268 are example implementations of the second fastening elements 168 described above, and are configured to receive a fastener inserted therethrough. A head of the fastener may abut a rear face of the vertical fin 267. A front face 267a of the vertical fin 267 may abut and rest in flush contact with a vertical face of a vertical support, such as a rear face of backplane panel 290 (see FIG. 6) or a front face of riser cage bracket 390 (see FIG. 5), when the OCP connector 260 is installed therein such that the mating axis x is perpendicular to the vertical support (and hence parallel to a system board). The contact between front face 267a and vertical support helps to control the location of the connector along a forward/rearward axis, which assists in ensuring proper positioning of the connector 260. In addition, the contact between front face 267a and vertical support provides additional support to the connector 260, helping to resist tilting of the connector 260 in response to torques applied during mating/decoupling of an OCP edge connector with the connector 260. As shown in FIG. 2C, the OCP connector 260 further comprises second protrusions 269 on the vertical fin 267. Second protrusions 269 protrude horizontally forward from the front face of the vertical fin 267. The second protrusions 269 engage corresponding recesses in the vertical support to align the connector 260 relative to an installation position. Similar to the first protrusions 265, there are two second protrusions 269 in the shape of cylinders with tapered tips. Again, it should be understood that in other examples any number or shape of second protrusions 269 may be used.

Figure 3:
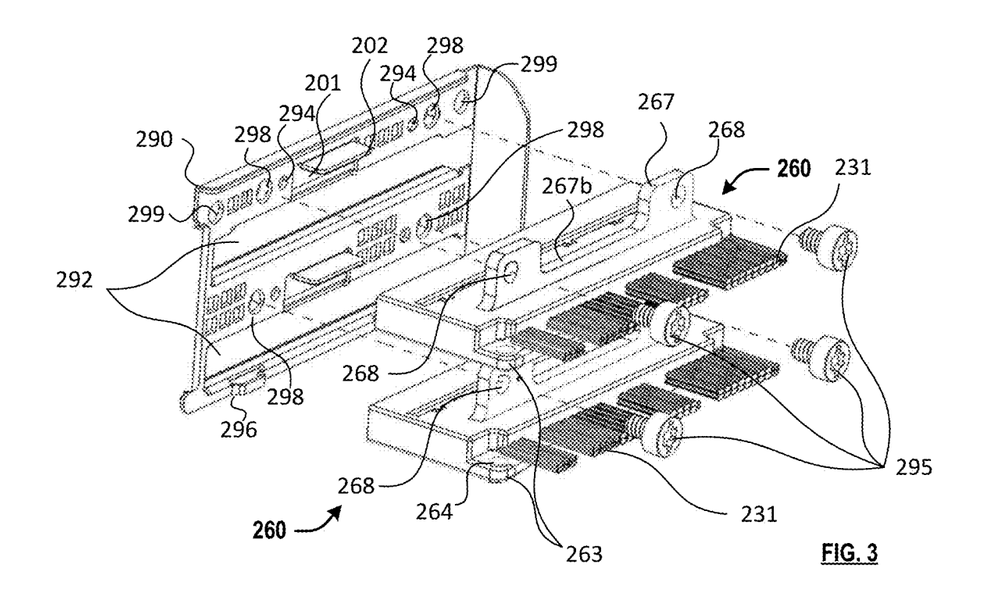
FIG. 3 is a perspective view of two cabled OCP connectors and a vertical support.

FIG. 3 illustrates vertical support 290 and two OCP cable assemblies 230 comprising example cabled OCP connectors 260. Vertical support 290 is one example configuration of the vertical support 190 described above. In some examples, the vertical support 290 may be attached to a removable module cage, which may include a dual-purpose drive cage which is configured to interchangeably receive storage drives and/or OCP modules. For example, in some implementations vertical support 290 is attached to drive cage 297 of FIG. 7, which is described in greater detail below. In some examples, the same drive cage may be convertible between a configuration to accept storage drives, a configuration to accept OCP modules, and (in some cases) a configuration to accept both storage drives and OCP modules, by changing a type of backplane which is provided for the drive cage. A storage backplane may be added to the drive cage to enable compatibility with storage drives for one or more bays aligned with the storage backplane, and the vertical support 290 (with OCP connectors 260 attached thereto) may be added to the drive cage to enable compatibility with OCP modules for one or more bays aligned with the OCP connectors 260. In some examples, both a storage drive backplane and the vertical support 290 can simultaneously be attached to the drive cage, with some bays thereof begin aligned with the storage drive backplane and other bays thereof being aligned with the vertical support 290. In other cases, one or the other of the storage backplane and vertical support 290 are used.

Figure 6:
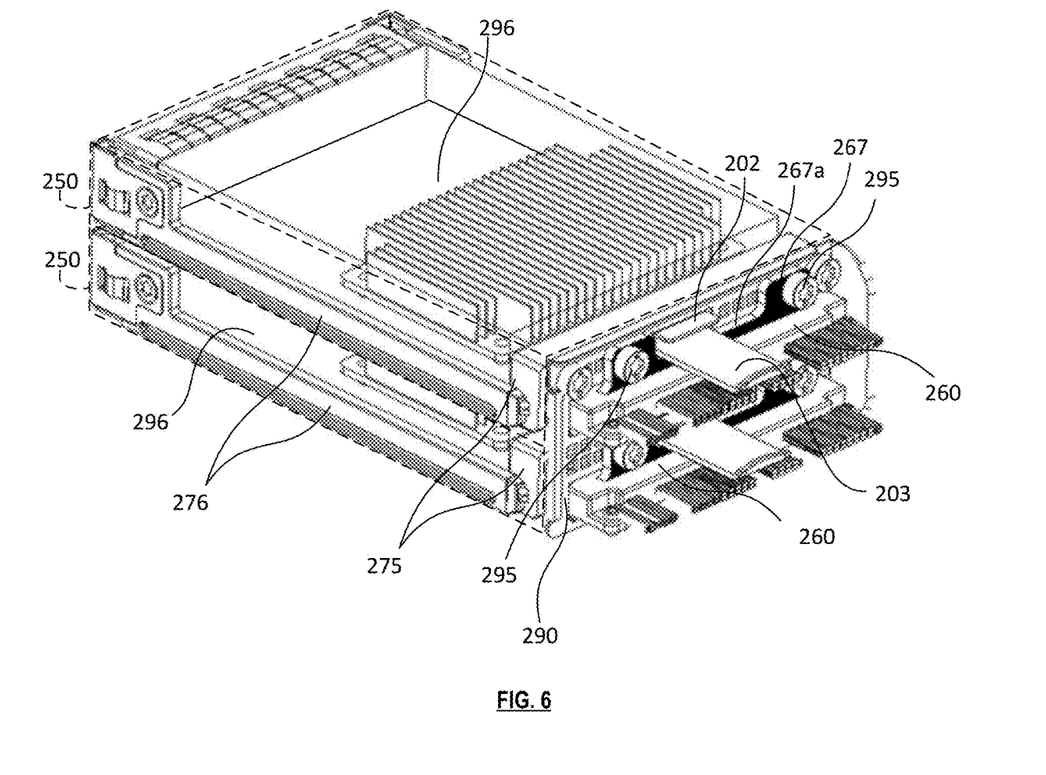
FIG. 6 is a perspective view of two cabled OCP connectors and a vertical support with two OCP modules in installed positions.
Figure 7:
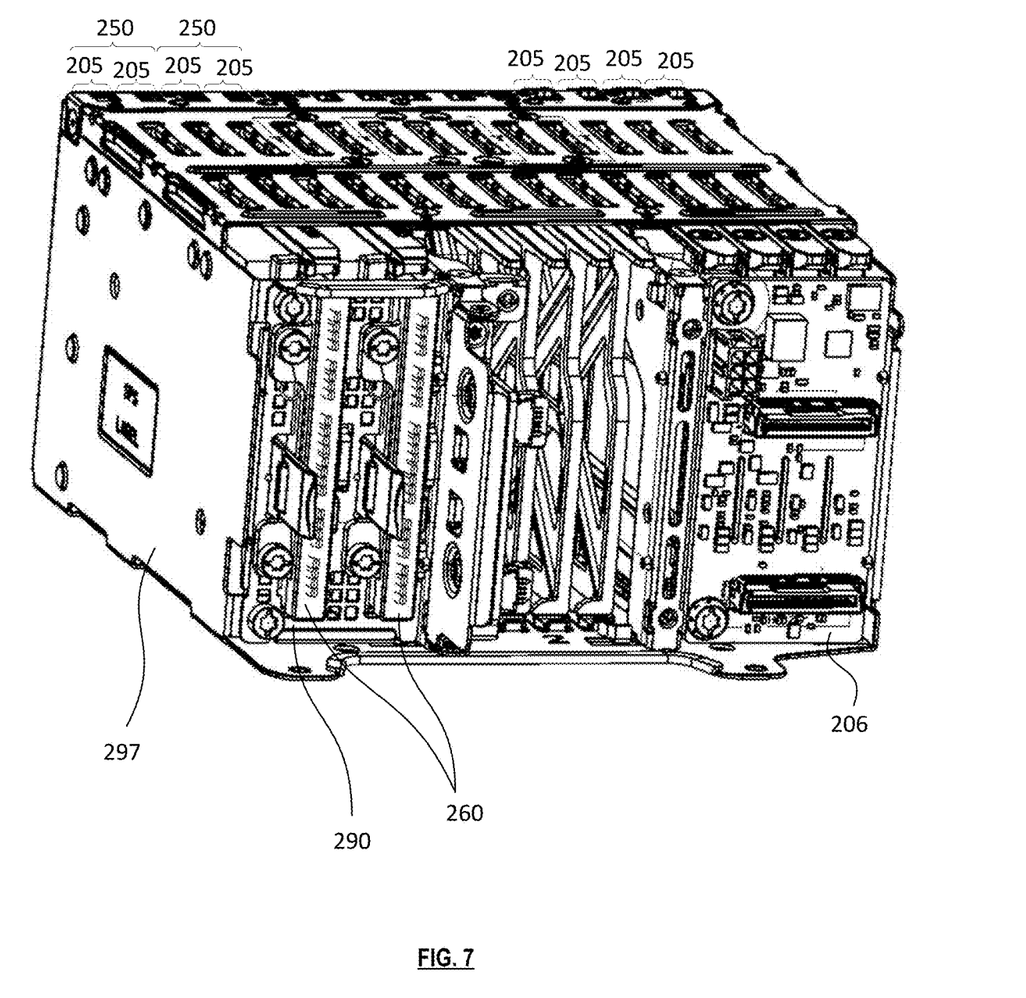
FIG. 7 is a perspective view of two cabled OCP connectors mounted in a dual-purpose cage.

The vertical support 290 comprises support openings 292 which are configured to receive a front-end portion of the body 232 of the connector 260 (the end comprising the receptacle 261) inserted therethrough. In this example, there are two support openings 292, and thus the vertical support 290 can have up to two cabled OCP connectors 260 mounted thereto, such as the cabled OCP connectors 260 in FIGS. 3, 6, and 7. FIG. 3 illustrates an exploded view, while FIGS. 6 and 7 show the connectors 260 engaged through the support opening 292 of the vertical support 290. In other examples, the size of the vertical support 290 could be increased and additional support openings 292 could be added to increase the number of connectors 260 which can be mounted to the vertical support 290. The insertion of the OCP connectors 260 into the openings 292 provides a gross level of alignment of the connector 260 with a desired installation position. Engagement of the protrusions 269 with the corresponding recesses 294 in the vertical support 290 provides a finer level of alignment. Once so engaged, the fasteners 295 may be used to attach the cabled OCP connectors 260 to the vertical support 290 by insertion through the aperture 268 of the fin 267 and then into apertures 298 in the vertical support 290. In the illustrated example, the fasteners 295 are screws, and the apertures 298 may include threading to engage with the threading of the screws or a separate nut may be positioned on the opposite face of the vertical support 290 over the apertures 298 to engage the threading of the screws. The aperture 298 and/or nut (if present) are examples of the fastening elements 198 described above.

Once the connector 260 is attached to vertical support 290, the fin 267 abuts the rear face of the vertical support 290. As shown in FIG. 3, the vertical support 290 comprises an opening 201 and a latch engaging feature 202 at the opening 201. Moreover, the fin 267 comprises a lowered portion 267b which is aligned with the opening 201 when the connector 260 is attached to the vertical support 290. The opening 201 is to receive a latch 203 of an OCP module, and the lowered portion 267b allows for the latch to extend through the opening 201 without obstruction by the fin 267, as shown in FIG. 6. The latch 203 engages with the latch engaging feature 202, as shown in FIG. 6.

When the vertical support 290 is attached to a drive cage, the openings 292 may be aligned with bays of the drive cage such that, when the connectors 260 are attached to the vertical support 290, the connectors 260 are positioned to blind mate with OCP modules inserted into the bays. For example, FIG. 6 illustrates two OCP modules 296 which have been inserted into two front bays 250 and mated with two OCP connectors 260 attached to vertical support 290. The front bays 250 are defined by a drive cage, such as drive cage 297 of FIG. 7, but the drive cage has been omitted from view in FIG. 6 to allow visibility of other aspects. Each connector 260 is aligned with a bay 250. As noted above, the drive cage may be able to receive either storage drives or OCP modules. This may be enabled through the use of adapters, such as the OCP adapters 275 illustrated in FIG. 6. The adapters 275 are attached to the OCP modules 296 and provide engagement features 276 which are sized, shaped, and located so as to be able to engage with complementary engagement features in the drive cage and, when so engaged, to guide the OCP module 296 into a proper installation position in which the edge connector thereof can blind mate with the OCP connector 260 attached to the vertical support 290 and aligned with the bay 250 in which the OCP module 296 is inserted. The engagement features of the drive cage may be configured to natively engage with a particular form factor of storage drive, and thus storage drives may be installed in the drive cage without the use of an adapter. In some examples, a given bay 250 for an OCP module may be formed by multiple (e.g., two) of bays for storage drives.

As shown in FIG. 7, in some examples the vertical support 290 with the connectors 260 attached thereto is attached to a rear side of a drive cage 297. This drive cage may be disposed in a front of a chassis of a computing device. In the example illustrated in FIG. 7, the drive cage 297 includes multiple storage drive bays 205, each sized to receive a storage drive of a given form factor (e.g., EDSFF). The vertical support 290 covers four of these storage drive bays 205, with these four bays 205 forming two front OCP bays 250 which each comprise two adjacent storage drive bays 205. Each front OCP bay 250 is aligned with one of the OCP connectors 260 attached to the vertical support 290. A separate storage backplane 206 is also attached to the drive cage 297 and covers four other bays 205. This storage backplane 206 comprises connectors aligned with the bays 205 so as to blind mate with storage drives inserted therein. Additional bays are also provided (not labeled), which are illustrated as having drive blanks installed therein but which could have any other type of device installed therein. As illustrated, the drive cage 297 allows for both OCP modules 296 to be installed therein (via the two OCP bays 250) and storage drives to be installed therein (via other bays 205). It should be understood that additional vertical supports 290 could be attached to the drive cage over other bays 205 to allow for additional OCP modules to be installed therein. Moreover, the vertical support(s) 290 could be installed covering any group of four bays 205 that is desired and is not limited to the position illustrated. Furthermore, additional storage backplanes 206 could be added to allow for the insertion of additional storage drives. In addition, other backplanes (not illustrated) could be added to facilitate the installation of other types of devices.

The drive cage 297 is one example of a drive cage with which the vertical support 290 and connectors 260 can be used, but the vertical support 290 is not limited to this drive cage 297. For example, vertical support 290 and connectors 260 could be used with a drive cage having only four storage bays 205, or any number of storage bays 205 greater than four. In addition, vertical support 290 and connectors 260 could be used in a module cage which is not designed to natively receive storage drives and is instead designed to natively receive OCP modules (without requiring an adapter).

Figure 4:
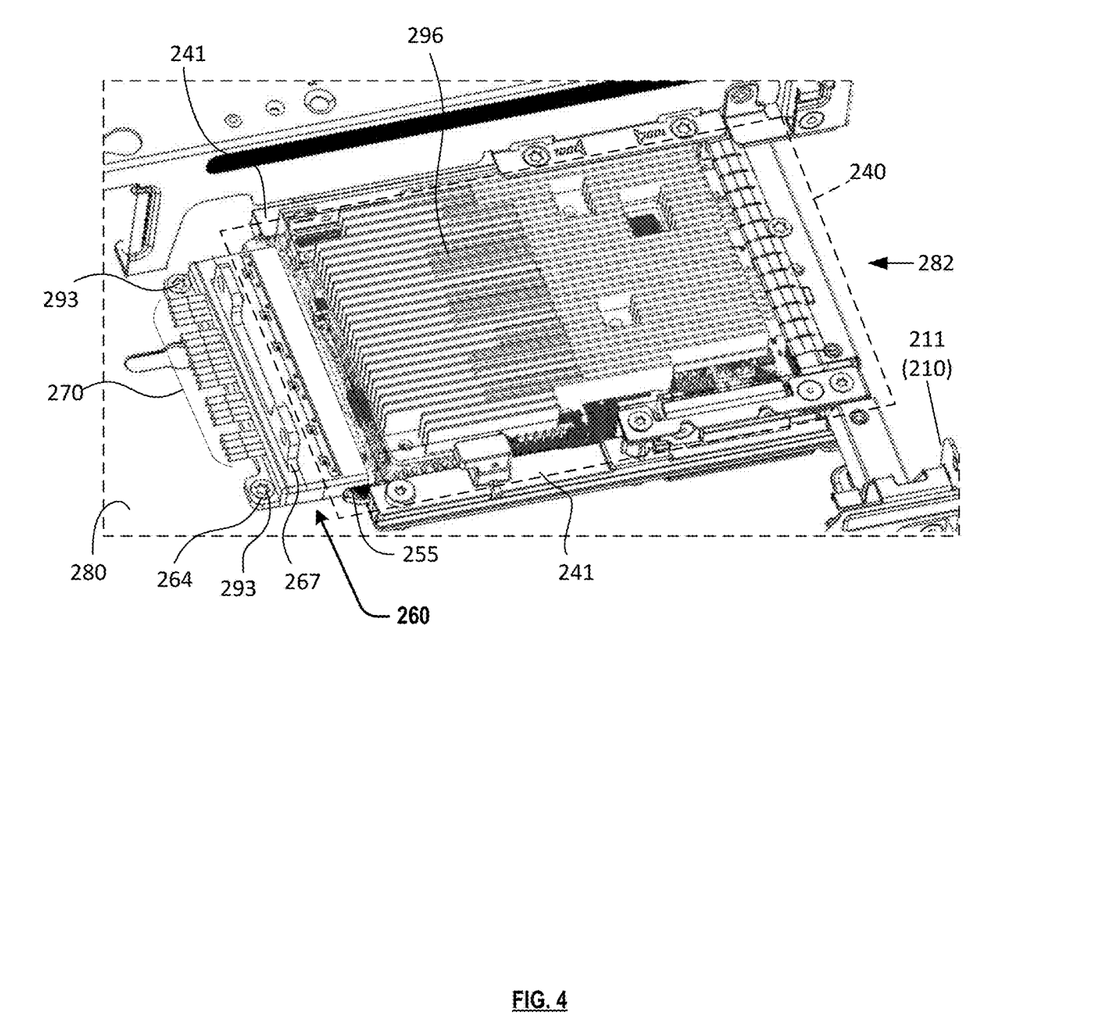
FIG. 4 is a view of a cabled OCP connector mounted to a horizontal support with an OCP module in an installed position.

FIG. 4 illustrates example cabled OCP connector 260 of a OCP cable assembly 230 attached to a horizontal support 280. In the illustrated example, the horizontal support 280 is part of a motherboard tray which is mounted to the chassis 210 of a computer system 200 and which supports a primary system board of the computer system 200. The horizontal support 280 is located at a front end of a rear OCP bay 240. The rear OCP bay 240 is defined by two OCP guide rails 241, which are also mounted to the motherboard tray, and an opening 282 in the rear panel 211 of the chassis 210. The OCP connector 260 is connected to the horizontal support 280 using two fasteners 293 engaged through first apertures 264 with corresponding fastener receivers (e.g., apertures) (not visible) in the horizontal support 280. In addition, horizontal wall 263 is in flush contact with the top surface of the tray, with the first protrusions 265a engaged with corresponding aperture (not visible) in the tray and the protrusion 265b engaged with either a rear-facing edge (not visible) of the tray (if the tray has a cut-out portion (not visible) in the space corresponding to the bay 240) or another aperture (not visible). The first protrusions 265 align the connector 260 relative to the bay 240 such that an OCP module 296 installed in the bay blind mates with the connector 260. More specifically, the opening 282 is provided in the rear panel 211 of the chassis 210 to allow for insertion and removal of an OCP module 296 into the rear OCP bay 240 from outside the chassis 210 via the opening 282. Side edges of a PCB of the OCP module 296 engage with grooves extending along the guide rails 241 as the OCP module 296 is inserted into the bay 240 to guide the OCP module 296 into an installation position in which an OCP edge connector 255 of the OCP module 296 blind mates with of the connector 260 (i.e., is received in the receptacle 261). Once the OCP module 296 is in the installed position, the rails 241 support the OCP module 296 and secure it to the chassis 210. Cabled OCP connector 260 is shown connected with an example OCP module 296. In this installation configuration, vertical fin 267 is present, but unused. Also shown is cable 270 which connects to another connector (not shown) which is connected to the system board, thus connecting the OCP module 296 communicatively and electrically to the primary system board.

Figure 5:
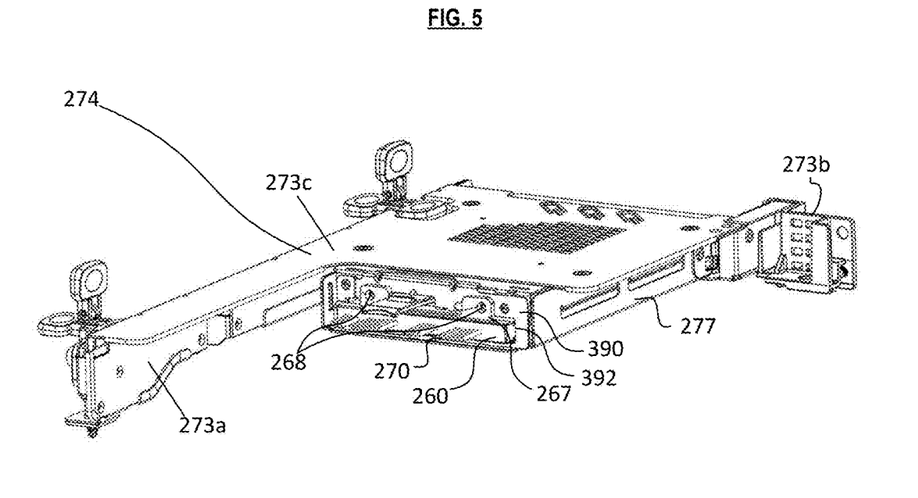
FIG. 5 is an illustration of a cabled OCP connector mounted to a riser cage.

FIG. 5 illustrates example cabled OCP connector 260 attached to vertical support 390 which is attached to a riser cage 274. The vertical support 390 is another example of the vertical support 190 described above. In this example, the vertical support 390 is a riser cage bracket. The riser cage 274 is used to connect an expansion card to a primary system board. Riser cage 274 comprises a number of panels 273 coupled together including: a vertical rear panel 273b, a vertical side panel 273a coupled perpendicularly to the rear panel 273b, a horizontal top panel 273c coupled to the rear and side panels 273b and 273a. The riser cage 274 also includes a drive enclosure 277 attached to some or all of the panels 273. The drive enclosure 277 is configured to receive an OCP module. A front face of the drive enclosure 277 comprises the vertical support 390. The OCP connector 260 attached to the vertical support 390 faces rearward into an interior space within the drive enclosure 277.

The vertical support 390 includes a support opening 392 and the OCP connector 260 is inserted into this opening 392 in the attached state. Fasteners (omitted from the view to avoid obscuring other features) may be inserted through second apertures 268 of vertical fin 267 and into corresponding fastener receivers (e.g., apertures) (not visible) in vertical support 390 to attach the cabled OCP connector 260 to vertical support 390. Moreover, in the attached state, the fin 267 abuts the front face of the vertical support 390. Protrusion 269 (not visible in FIG. 5) are engaged with corresponding recesses (not visible) in the vertical support 390. Riser cage 274 may be deployed at a rear of the chassis of a computer system, as is common for riser cages, with rear panel 273b being coupled to a rear panel of the chassis (the rear panel 237b may thereafter become part of the rear panel of the chassis). Also shown is cable 270 which is connected to a second connector (not illustrated) connected to the system board such that the OCP module mated with the connector 260 is communicatively and electrically connected to the primary system board.

Figure 8:
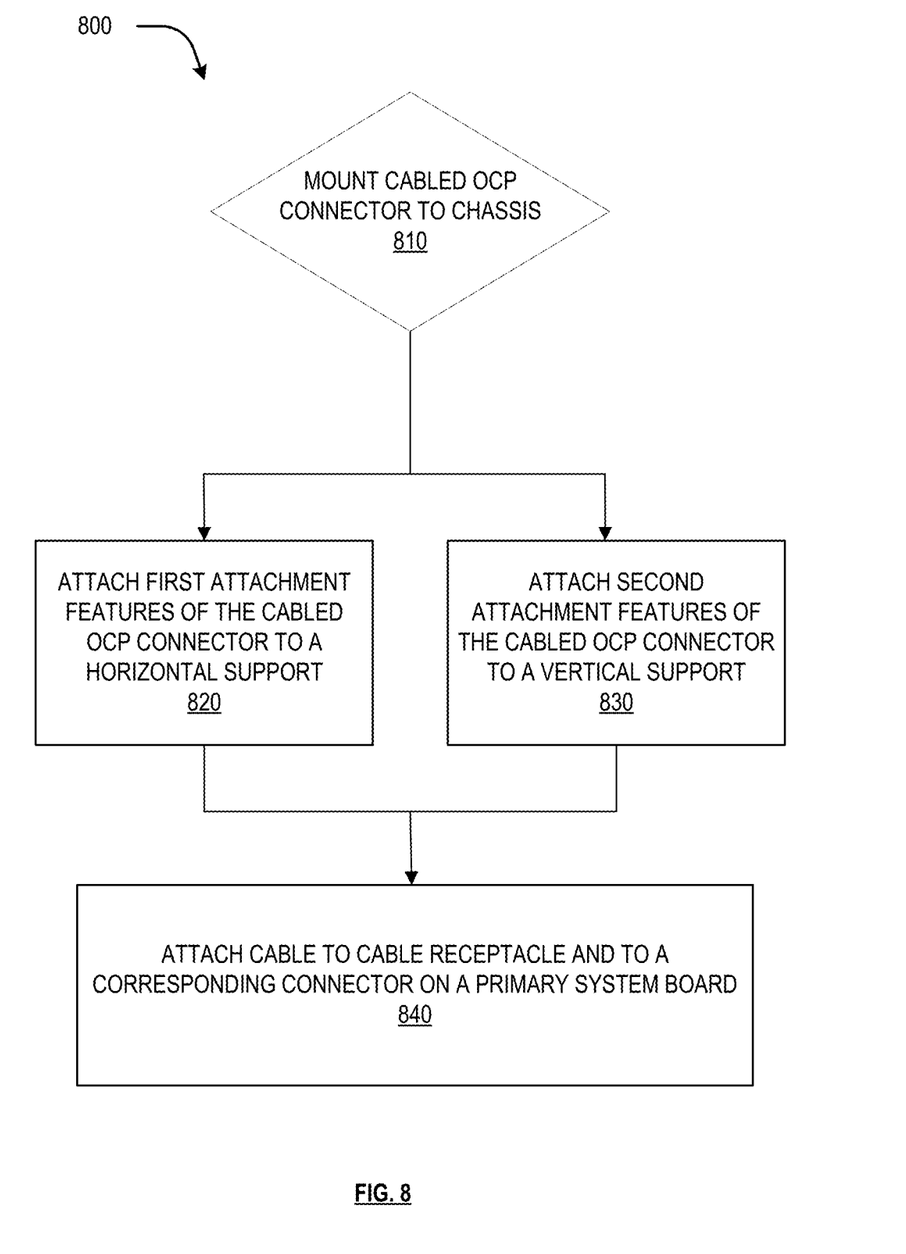
FIG. 8 illustrates an example process flow for using a cabled OCP connector.

FIG. 8 illustrates an exemplary method 800 for using a cabled OCP connector, such as cabled OCP connector 260 shown in previous FIGS. 2-7. Method 800 begins in step 810 where a cabled OCP connector is mounted to a chassis. This is accomplished by either step 820 or step 830. In step 820 the first attachment features of the cabled OCP connector are attached to a horizontal support. In step 830 the second attachment features of the cabled OCP connector are attached to a vertical support. In step 840 a cable is attached to the cable receptacle of the cabled OCP connector, and the other end of the cable is attached to a corresponding connector on the primary system board. The cabled OCP connector may be mounted in such a way that it is useable with either a front-accessible bay or a rear-accessible bay and where an OCP module may be inserted in either bay and mated with the OCP edge receptacle of the cabled OCP connector.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of $\{A\}, \{B\}, \{C\}, \{A, B\}, \{A, C\}, \{C, B\},$ and $\{A, C, B\}$".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A device comprising:
   a cable;
   an open compute project (OCP) connector connected to a first end of the cable and comprising a receptacle configured to mate with an edge connector of an OCP module, first attachment features coupled to the receptacle, and second attachment features coupled to the receptacle;
   a second connector connected to a second end of the cable and configured to mate with a connector mounted to a primary system board of an information processing device;
   wherein the first attachment features are configured to attach the OCP connector to a horizontal support of the information processing device which is parallel to a mating axis of the receptacle; and
   wherein the second attachment features are configured to mount the OCP connector to a vertical support of the information processing device which is perpendicular to a mating axis of the receptacle.

2. The device of claim 1,
   wherein the second attachment features comprise:
   a vertical fin protruding from the receptacle, the vertical fin comprising an engagement face configured to, in an attached state of the OCP connector to the vertical support, be parallel to and engage with the vertical support; and
   one or more second apertures extending horizontally through the vertical fin and configured to receive a fastener.

3. The device of claim 2, wherein the second attachment features comprise one or more protrusions protruding from the vertical fin and configured to engage with complementary recesses in the vertical support and control a position of the OCP connector relative to the vertical support.

4. The device of claim 2, wherein the vertical support comprises an opening and, in an attached state of the OCP connector to the vertical support, the receptacle extends through vertical support via the opening with the vertical fin abutting the vertical support adjacent the opening.

5. The device of claim 4, wherein the vertical support is a vertical panel positioned adjacent a front-accessible bay of the information processing device with the opening aligned with a front-accessible bay such that, in an attached state of the OCP connector to the vertical panel, the receptacle is positioned to mate with the edge connector of an OCP module installed in the front-accessible bay.

6. The device of claim 4, wherein the vertical support is a vertical bracket of a riser cage of the information processing device such that, in an attached state of the OCP connector to the vertical bracket, the receptacle is positioned to mate with the edge connector of an OCP module installed in the riser cage.

7. The device of claim 1,
   wherein the first attachment features comprise:
   a horizontal wall configured to, in an attached state of the OCP connector to the horizontal support, be parallel to and engage with the horizontal support; and
   one or more first apertures extending vertically through horizontal wall and configured to receive a fastener.

8. The device of claim 7, wherein the horizontal wall forms a bottom wall of the receptacle.

9. The device of claim 8, wherein the horizontal support is a motherboard tray or basepan of a chassis of the information processing device and the OCP connector is configured to be attached to the horizontal support adjacent a rear-accessible bay of the information processing device such that the receptacle is positioned to mate with the edge connector of an OCP module installed in the rear-accessible bay.

10. The device of claim 1, wherein the receptacle comprises an OCP 4C connector or OCP 4C+ connector.

11. A computing system comprising:
    a chassis configured to house a primary system board;
    a primary system board mechanically coupled to the chassis, the primary system board comprising a connector;
    a front-accessible bay configured to receive a removeable module through a front panel of the chassis;
    a vertical support positioned adjacent to the front-accessible bay, the vertical support being coupled to or part of the chassis;
    a rear-accessible bay configured to receive a removable module through a rear panel of the chassis;
    a horizontal support supporting the primary system board, the horizontal support being coupled to or part of the chassis; and
    a cabled OCP connector comprising:
    a cable;
    an open compute project (OCP) connector connected to a first end of the cable and comprising a receptacle configured to mate with an edge connector of an OCP module, first attachment features coupled to the receptacle, and second attachment features coupled to the receptacle; and
    a second connector connected to a second end of the cable and mated with the connector of the primary system board;
    wherein the first attachment features are configured to attach the OCP connector to the horizontal support such that the receptacle is positioned to receive the edge connector of an OCP module inserted into the rear-accessible bay with a mating axis of the receptacle parallel to the horizontal support; and
    wherein the second attachment features are configured to mount the OCP connector to the vertical support such that the receptacle is positioned to receive the edge connector of an OCP module inserted into the front-accessible bay with the mating axis of the receptacle perpendicular to the vertical support.

12. The computing system of claim 11, the computing system further comprising:
a riser cage coupled to or part of the chassis, wherein the vertical support is coupled to or part of the riser cage.

13. The computing system of claim 12, wherein the vertical support is a metal frame coupled with the riser cage.

14. The computing system of claim 11,
wherein the second attachment features comprise:
a vertical fin protruding from the receptacle, the vertical fin comprising an engagement face configured to, in an attached state of the OCP connector to the vertical support, be parallel to and engage with the vertical support; and
one or more second apertures extending horizontally through the vertical fin and configured to receive a fastener.

15. The computing system of claim 14, wherein the second attachment features comprise one or more protrusions protruding from the vertical fin and configured to engage with complementary recesses in the vertical support and control a position of the OCP connector relative to the vertical support.

16. The computing system of claim 11,
wherein the first attachment features comprise:
a horizontal wall configured to, in an attached state of the OCP connector to the horizontal support, be parallel to and engage with the horizontal support; and
one or more first apertures extending vertically through horizontal wall and configured to receive a fastener.

17. The computing system of claim 16, wherein the horizontal support is a motherboard tray or basepan of the chassis.

18. A method comprising:
mounting a cabled OCP connector to a chassis by either:
attaching first attachment features of the cabled OCP connector to a horizontal support, wherein the horizontal support is parallel to an OCP edge receptacle, and a cable receptacle; or
attaching second attachment features to a vertical support, wherein the vertical support is perpendicular to the OCP edge receptacle, and the cable receptacle; and
attaching the cable to the cable receptacle and to a corresponding connector on a primary system board,
wherein the OCP edge receptacle is configured to mate with an edge connector of an OCP module,
wherein the cable receptacle is configured to mate with a cable.

19. The method of claim 18, wherein the cabled OCP connector is mounted to the chassis such that the OCP module is inserted into a front-accessible bay and mated with the OCP edge receptacle.

20. The method of claim 19, wherein the cabled OCP connector is mounted to the chassis such that the OCP module is inserted into a rear-accessible bay and mated with the OCP edge receptacle.

* * * * *